United States Patent [19]
Farley

[11] Patent Number: 5,157,822
[45] Date of Patent: Oct. 27, 1992

[54] PLATE WORKING MACHINE

[75] Inventor: Peter A. Farley, Heidelberg, Australia

[73] Assignee: Farley Cutting Systems Australia Pty. Ltd., Glenroy, Australia

[21] Appl. No.: 449,828

[22] PCT Filed: May 17, 1988

[86] PCT No.: PCT/AU88/00149

§ 371 Date: Dec. 8, 1989

§ 102(e) Date: Dec. 8, 1989

[87] PCT Pub. No.: WO88/09236

PCT Pub. Date: Dec. 1, 1988

[30] Foreign Application Priority Data

May 18, 1987 [AU] Australia ................. P12016

[51] Int. Cl.⁵ .................................. B23B 39/00
[52] U.S. Cl. ........................ 29/26 A; 408/98; 408/95; 408/234; 408/138; 408/88; 219/121.39; 83/462; 409/904; 409/241
[58] Field of Search .................. 408/3, 67, 51, 22, 24, 408/51, 95-98, 103, 111, 234, 88, 237, 138; 29/26 A; 83/460-462, 451, 375, 379; 219/121.36, 121.39, 121.48, 121.67, 121.18, 121.29, 69.11; 269/25, 235, 212; 409/202, 241, 900.2, 904, 190, 191; 254/423, 93 H; 144/136 R, 134 B

[56] References Cited

U.S. PATENT DOCUMENTS

| | | |
|---|---|---|
| 2,546,957 | 3/1951 | Ray ........................ 408/88 |
| 2,664,073 | 12/1953 | Pine ........................ 254/93 H |
| 3,180,183 | 4/1965 | Stanley et al. ............. 408/234 X |
| 3,259,020 | 7/1966 | Walker . |
| 3,436,067 | 4/1969 | Dodge ..................... 83/461 |
| 3,587,391 | 6/1971 | Pitts ....................... 409/235 |
| 3,748,053 | 7/1973 | Galbarini et al. ........... 408/234 |
| 3,770,031 | 11/1973 | Olson ..................... 144/136 P |
| 3,851,864 | 12/1974 | Miller ..................... 219/121.39 |
| 3,869,002 | 3/1975 | Koenig, III . |
| 3,931,491 | 1/1976 | Stumpf .................... 219/121.67 |
| 4,014,519 | 3/1977 | Leigh ...................... 254/423 |
| 4,039,799 | 8/1977 | Stumpf .................... 219/121.67 |
| 4,087,076 | 5/1978 | Getty ...................... 254/93 R |
| 4,087,670 | 5/1978 | Miller ..................... 219/121.48 X |
| 4,158,987 | 6/1979 | Smith ..................... 409/190 |
| 4,251,174 | 2/1981 | Sater ...................... 409/191 X |
| 4,261,285 | 4/1981 | Pearl ...................... 408/3 |
| 4,304,512 | 12/1981 | Vierstraete ................ 409/191 X |
| 4,335,296 | 6/1982 | Bredow .................... 219/121.67 |
| 4,382,728 | 5/1983 | Anderson et al. ........... 409/137 |
| 4,514,122 | 4/1985 | Campbell .................. 409/190 |
| 4,530,627 | 7/1985 | Kosmowski ............... 409/235 |
| 4,642,004 | 2/1987 | Matifas .................... 409/136 |
| 4,752,160 | 6/1988 | Murray et al. ............. 29/26 A X |
| 4,792,657 | 12/1988 | Conley .................... 219/121.48 X |
| 4,966,508 | 10/1990 | Otani et al. ............... 144/136 R X |

FOREIGN PATENT DOCUMENTS

| | | |
|---|---|---|
| 143726 | 11/1948 | Australia . |
| 6421880 | 11/1980 | Australia . |
| 0194173 | 9/1986 | European Pat. Off. . |
| 2230473 | 12/1974 | France ..................... 219/121.67 |
| 2498508 | 1/1981 | France ..................... 408/3 |
| 2600921 | 7/1986 | France . |
| 96747 | 6/1982 | Japan . |
| 109239 | 6/1983 | Japan . |
| 56389 | 9/1983 | Japan . |
| 2094993 | 9/1982 | United Kingdom ........ 219/121.67 |

Primary Examiner—Larry I. Schwartz
Attorney, Agent, or Firm—Rothgerber, Appel, Powers & Johnson

[57] ABSTRACT

A plate working machine comprising a metal plate supporting table (1), a pair of rails (2, 3) extending along the sides of the table (1), a driven support means (4) for travel along the rails (2, 3), said support means comprising a spaced pair of support beams (5, 6) extending from one rail (2) to the other (3) and joined at either end by cross members (7, 8). A drilling assembly (9) is mounted on tracks (10, 11) mounted on the beams (5, 6) and a plasma profiling head (12) is carried by the drilling assembly (9) and extends over the beam (6) and downwardly towards a position adjacent the table (1).

9 Claims, 8 Drawing Sheets

PLATE WORKING MACHINE

FIELD OF THE INVENTION

This invention relates to improvements in metal plate working machines and more particularly to a machine capable of performing cutting and drilling operations over a single plate supporting structure.

BACKGROUND OF THE INVENTION

Most metal plate working involves both cutting by means of a guillotine or by means of an oxy-fuel type profile cutter, and subsequent drilling, tapping or counterboring. Many plate working operations also require line marking for subsequent bending and welding operations.

At the present time, the above functions are performed by means of separate and distinct machines and accordingly the metal plate being worked must be transported from one machine to another. Thus, much of the labour expended in working metal plates is consumed in transporting the plate in the workshop. Where a plate is very large and heavy, the moving operation may occupy a considerable amount of time and involve expensive transporting equipment. Thus, it is not surprising that studies have shown that up to ninety percent of labour expended in preparing a metal plate component is not actually adding value to the plate. In addition, many of the drilling machines presently in use have serious limitations on the size of plate that can be accepted for drilling and even these machines are extremely expensive.

BRIEF SUMMARY OF THE INVENTION AND OBJECTS

It is an object of the present invention to provide a plate working machine by means of which the labour cost associated with the fabrication of metal plate components may be reduced.

The invention accordingly provides a plate working machine comprising means for supporting a metal plate to be worked in a generally horizontal plane, a pair of rails extending along the sides of said plate supporting means, driven support means engaging said rails for travel therealong, said support means comprising a spaced pair of support beams extending from one rail to the other and joined at either end by cross members, means for supporting drilling means between said support beams, said supporting means being mounted on tracks on said beams, and drive means for moving said drilling means along said support beams from one side of said plate supporting means to the other.

The machine preferably includes profile cutting means mounted on said supporting means for said drilling means and extending over one of said beams and downwardly towards a position adjacent said plate supporting means.

In a preferred form of the invention, the tracks on the beams are secured to the top of one beam and to the bottom of the other beam. This positioning of support means provides optimum location of drill support means, thus reducing deflection of the drilling means due to drilling forces.

Movement of the support means along the rails and the drilling and profiling means along the beams is achieved by electric motors, each of which drives a gear box and a pair of pinion gears which mesh with racks mounted on the top of one of the rails and on the top of one of the support beams.

Each gearbox is preferably provided with a gear arrangement which biases said pinions in opposite directions so that the pinions engage opposing faces of the teeth of the rack to thereby reduce the backlash in the drive system to a minimum. It will be appreciated that accurate positioning of the drilling means and the profile cutting head is extremely important and for this reason the avoidance of backlash in the drive system is paramount.

In a preferred form of the invention, the plate working machine also includes means for marking the plate to be worked for subsequent bending and/or welding operations.

It will be appreciated from the above that the necessary drilling, tapping or counterboring, profile cutting, and if desired line marking, may be performed on the metal plate to be worked without moving the plate from the plate supporting means. As a result of this arrangement, the plate working operations may be performed far more efficiently with significant reductions in non-productive labour content. The cutting head of the profile cutting means and the drilling head of the drilling means may be accurately positioned by movement of the driven support means on which the support beams are mounted and by the drive means for moving the drilling means across the support beams.

The accurate positioning of the drilling means and cutting head, as well as the other operations performed by the machine, are controlled by a computerised numerical control system mounted at one end of the front support beam. The control system is programmed to automatically perform all movements and machine operations necessary to process large plates into finished parts. Since the support beams may be relatively long (of the order of four meters) compared to other drilling and profiling machines, and the plate supporting means may be of any desired length, but conveniently of the order of 16 meters, plates of substantial dimensions may be accommodated by the machine.

When a metal plate is drilled, tapped or counterbored, it is important that the plate be maintained in a stationary position with respect to the drilling head. At the present time, this is usually achieved by means of hydraulically operated clamping feet which apply substantial forces to the plate and therefore require substantial support structures to ensure that deflection of the plate and the drill support structure during drilling, and especially at the point of break-through, are minimised.

It is an object of another aspect of the present invention to provide an improved clamping mechanism for a plate working machine so that deflection of drilling means is minimised without necessitating use of substantial support structures for drilling means.

In a second aspect of the invention there is provided a clamping mechanism for a plate working machine comprising at least one clamping foot positioned to engage the plate to be worked, means for applying a substantially perpendicular clamping force to the plate to be worked through said foot and means for locking the clamping foot in the clamped position whereby the means applying the clamping force may be deactivated to reduce the loads applied to the structure supporting the clamping foot during plate working operations.

In a preferred form, a single clamping foot which partially surrounds the intended drilling portion is provided.

In a third aspect, the invention provides a plate working machine comprising means for supporting a metal plate to be worked in a generally horizontal plane, a pair of rails extending along the sides of said plate supporting means, driven support means engaging said rails for travel therealong, said support means comprising a spaced pair of support beams extending from one rail to the other and joined at either end by cross members, means for supporting drilling means between said support beams, said supporting means being mounted on tracks on said beams, and drive means for moving said drilling means along said support beams from one side of said plate supporting means to the other, plate clamping means supported by said means supporting said drilling means, means for applying a clamping force to said plate through said clamping means, said force being selected to be larger than the greatest expected drilling force, and means for locking the clamping means in its clamped position while said clamping force is applied to said plate.

It will be appreciated that by locking the clamping means in the plate clamping position, additional vertical forces due to plate working operations will not be added to the total vertical force on the supporting structure, as in prior art arrangements described above, and the total vertical load on the supporting structure is the greater of the forces applied by the plate working means or the clamping force. Thus, if the clamping force is always greater than the drilling force, then the total vertical load on the support structure will be invariant during plate drilling operations, thus ensuring no change in vertical position of the drilling means during drilling operations. Conventional designs must be much more rigid to reduce vertical movement as the total vertical force changes during drilling operation. In the case of the preferred embodiment described in greater detail below, the support beams are designed for loads of about 4 tonnes rather than loads of about 15 tonnes which would be required if a prior art clamping mechanism were to be used.

In a particularly preferred form of the above aspect, the locking means may comprise a deformable sleeve surrounding a piston rod extending from the means for applying the clamping force, said sleeve being deformed into locking engagement with said piston rod by means of fluid pressure to thereby lock the clamping feet in position.

BRIEF DESCRIPTION OF THE DRAWINGS

One presently preferred form of the invention will now be described with reference to the accompanying drawings in which:

FIG. 4A is a plan view showing the shape of the clamping foot;

Figure 1:
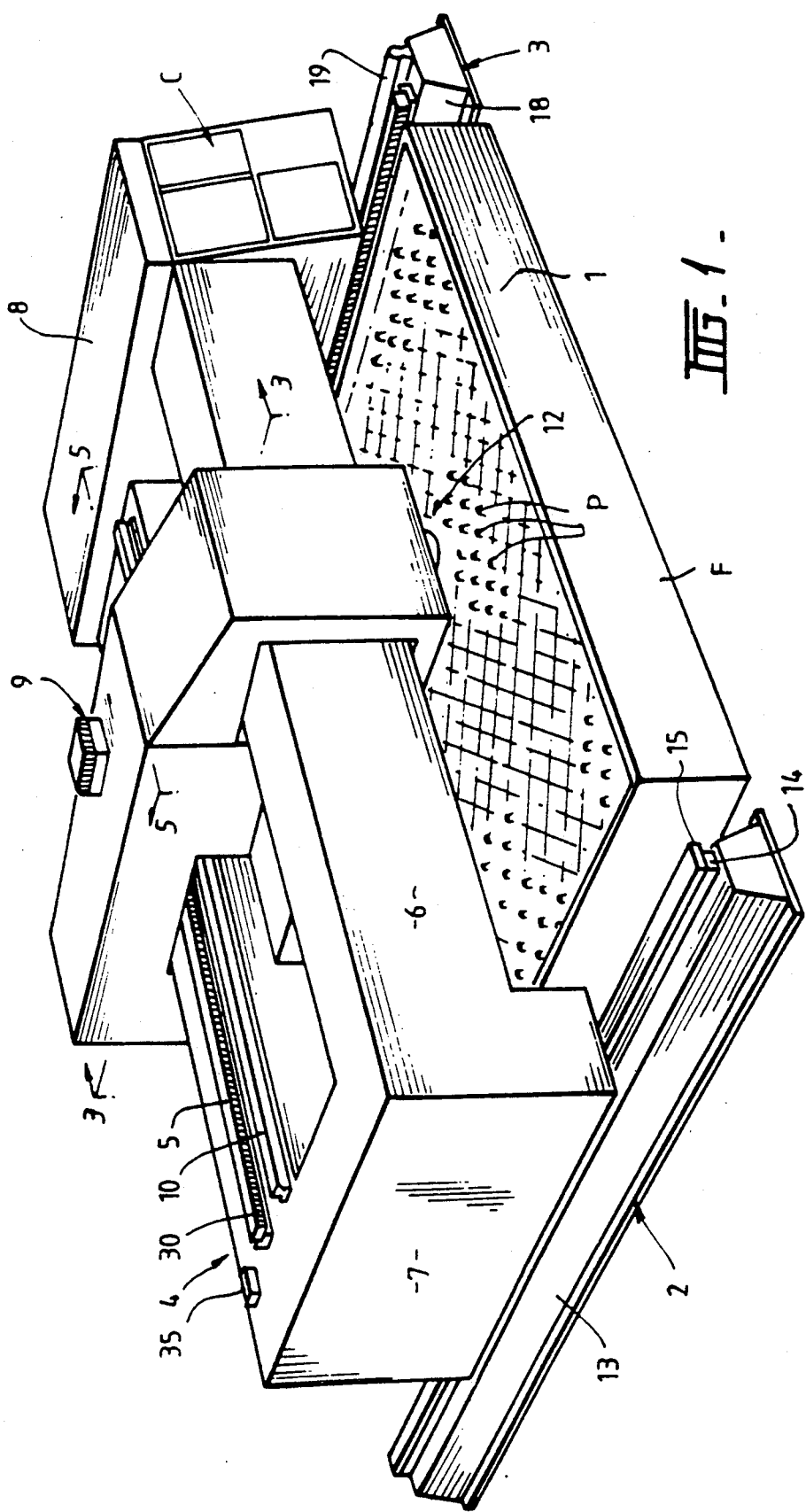
FIG. 1 is a perspective schematic view of the machine embodying the invention.

Referring firstly to FIG. 1 of the drawings, the plate working machine embodying the invention will be seen to comprise a metal plate supporting table 1 including an array of upstanding support pins P of aluminium or similar soft metal surrounded by an edge frame F, a pair of rails 2, 3 extending along the sides of the table 1, a driven support means 4 for travel along the rails 2, 3, said support means 4 comprising a spaced pair of support beams 5, 6 extending from one rail to the other and joined at either end by cross members 7 and 8. A drilling assembly 9 is mounted on tracks 10 and 11 (FIGS. 2 and 3) on the beams 5 and 6, and a high speed oxy/plasma profiling head 12 of known construction is carried by the drilling assembly 9 and extends over the beam 6 and downwardly towards a position adjacent the table 1.

Figure 2:
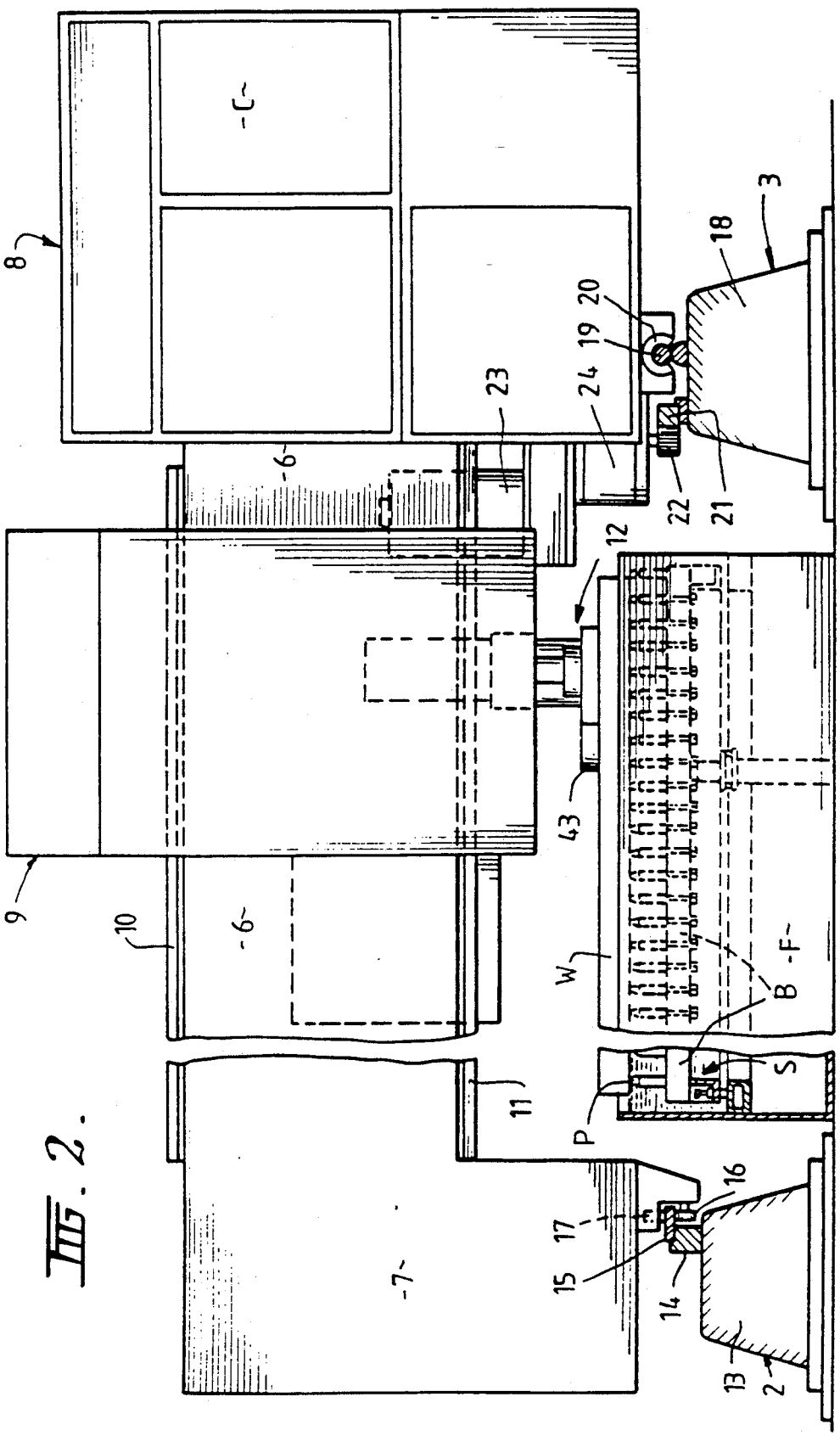
FIG. 2 is a fragmentary front elevation of the machine.
Figure 3:
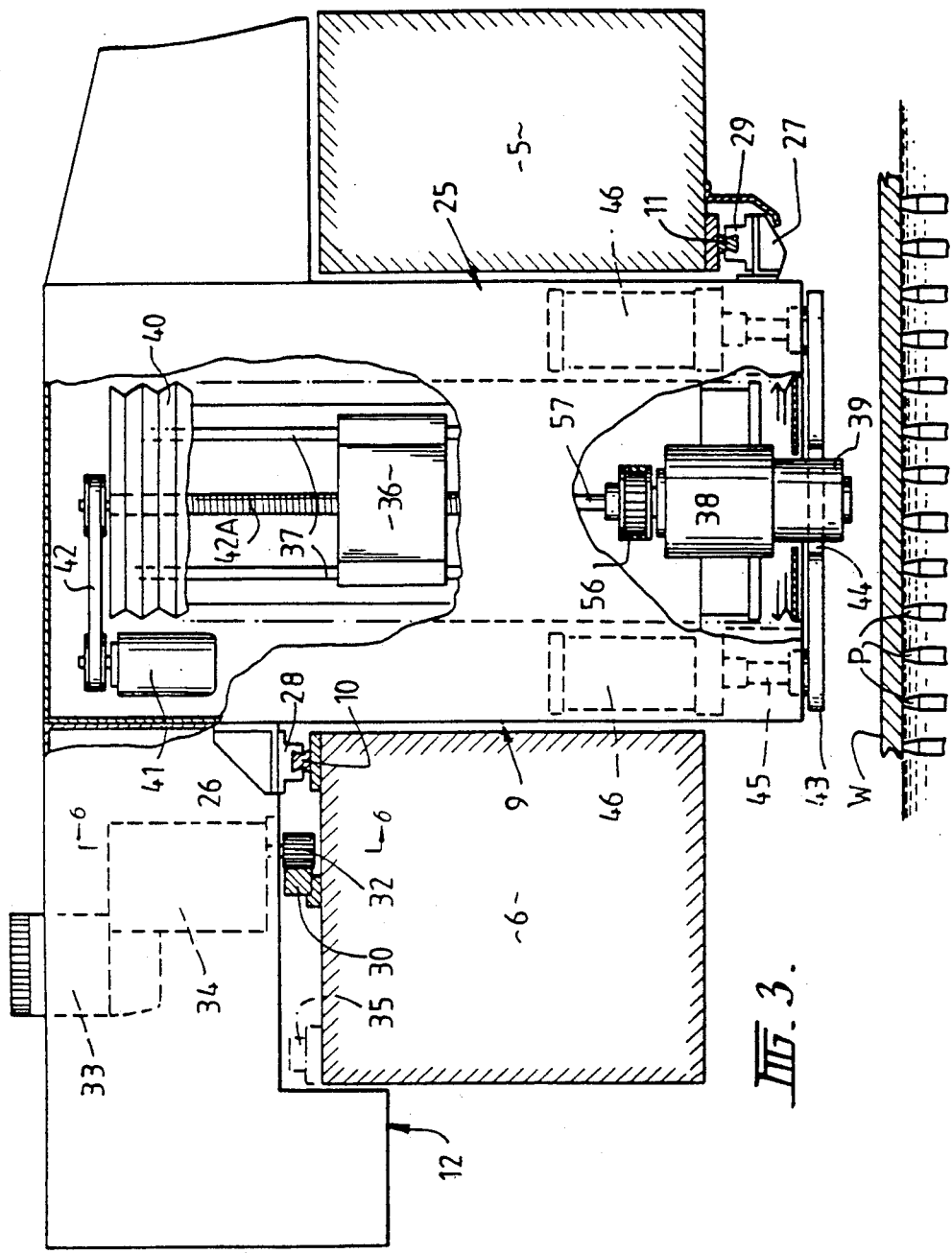
FIG. 3 is a fragmentary sectional end elevation of the drilling means and profile cutting support means.
Figure 5:
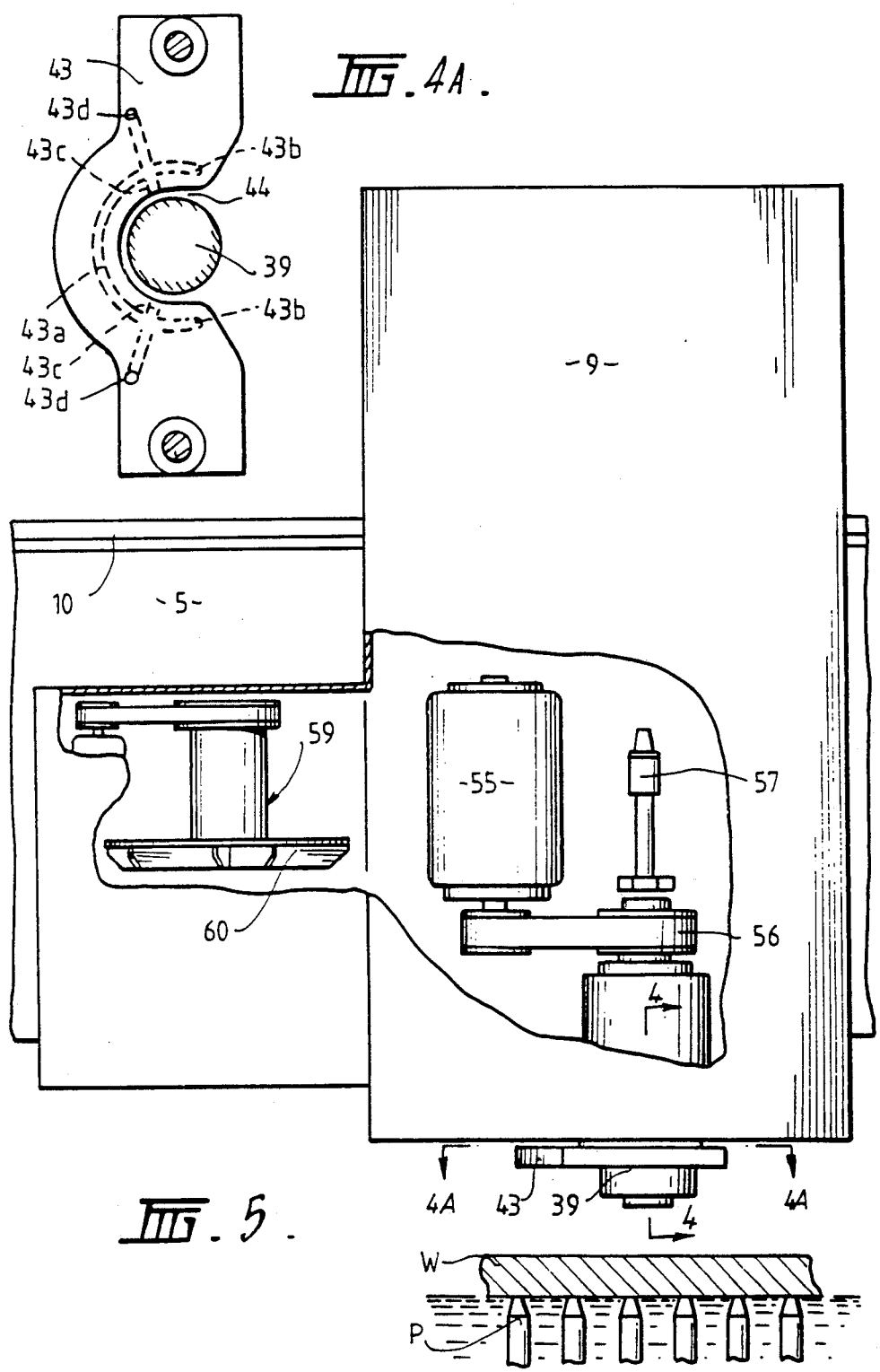
FIG. 5 is a fragmentary front elevation of the drilling means showing the drive arrangement therefor.

As will be seen from FIGS. 1, 2, 3 and 5 of the drawings, the support pins P have a pointed tip to minimise contact between the pins and the workpiece W and the pins P are arranged in arrays which are skewed at about 15° to the ends of the frame F. The frame F is adapted to contain water or other suitable coolant which is maintained in the frame F to a level approximately coincident to the tips of the pins P (FIGS. 3 and 5). The pins P are removably attached to support bars B adjustably supported within the frame F by support frame S, as shown in FIG. 2. The use of aluminium or similar soft metal for the pins P is preferred since less damage will be caused to the drilling tip as it breaks through a hole which happens to be coincident with a support pin P. The pins P also serve to conduct plasma current from the workpiece W to earth in the event that plasma cutting is performed at the same time as drilling operations. The use of pointed tips on the pins serves to minimise degradation of profile cutting operations.

Referring now to FIG. 2 of the drawings, the rail 2 comprises a supporting structure 13 on which is mounted a base rail member 14 and a laterally extending rail member 15 engaged by upper and lower roller bearings 16 and 17 mounted on a lower extension of the cross member 7. The rollers 16 and 17 support their end of the support structure for movement along the rail 2, the lower roller bearing 16 preventing upward movement of the support structure during drilling operations.

The rail 3 comprises a similar supporting structure 18 carrying a linear track 19 engaged by a linear bearing 20 and a rack 21 engaged by drive pinions 22 driven by an electric motor 23 through a gearbox 24 to be described in greater detail below. It will be appreciated that since the linear bearing 20 substantially encloses the rounded section of the linear track 19, upward movement of the support structure with respect to the track 3 is resisted.

Figure 4:
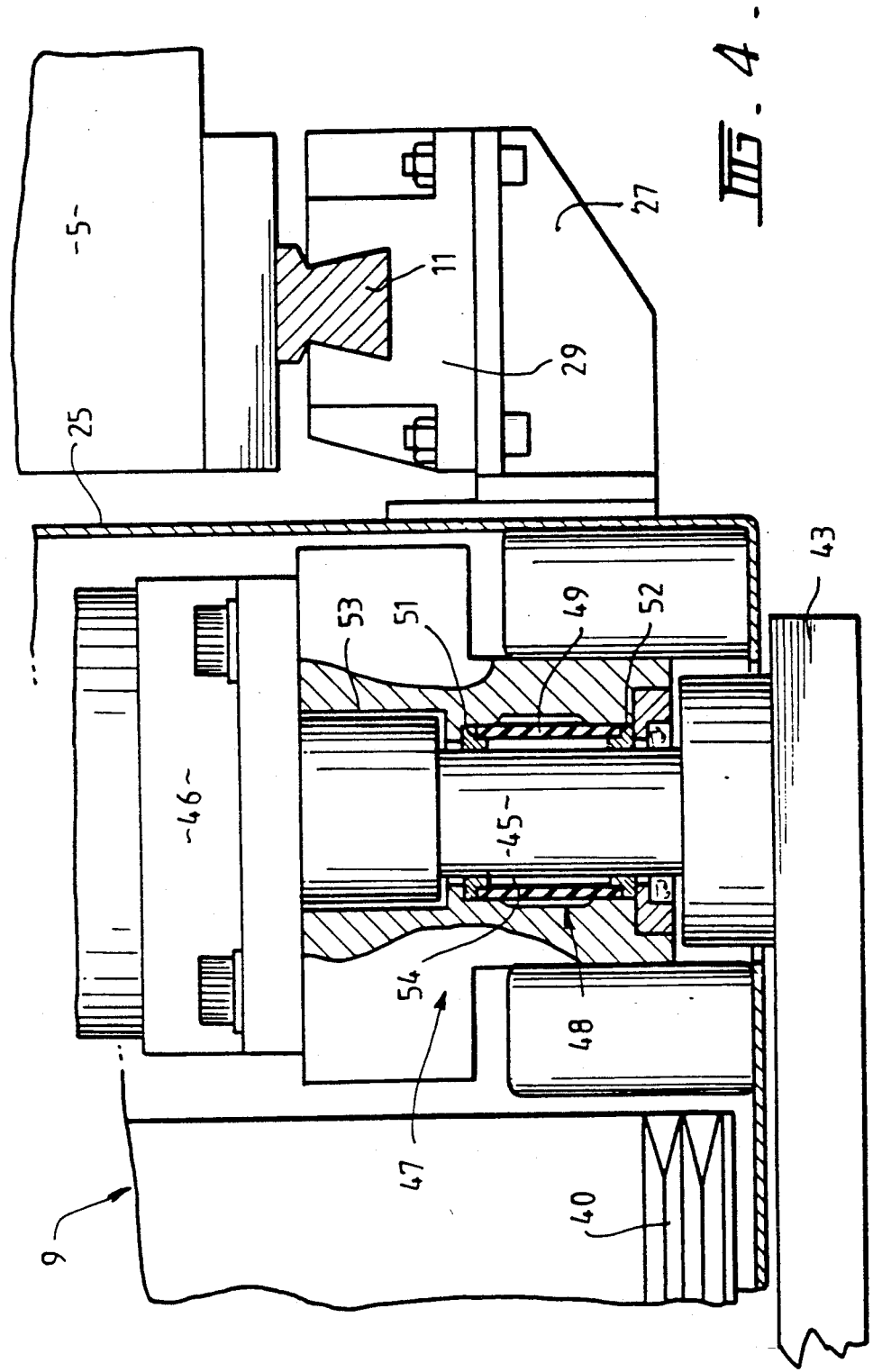
FIG. 4 is a detailed sectional elevation of the locking means for the clamping foot means.

Referring now to FIGS. 3 and 4 of the drawings, the drilling assembly 9 comprises a structurally rigid outer housing 25 carrying laterally extending supports 26 and 27 at upper and lower positions of opposed sides of the housing 25. The supports 26, 27 carry track engaging structures 28 and 29 which engage the tracks 10 and 11 mounted on the upper face of the support beam 6 and on the lower face of the support beam 5 respectively, as clearly shown in FIG. 3 of the drawings. The tracks 10 and 11 are of an inverted wedge shape and the track engaging structures 28 and 29 have a corresponding profile. This arrangement minimizes the upward and downward movement of the housing 25 with respect to the support beams 5 and 6.

The support beam 6 also carries a rack 30 engaged by a pair of drive pinions 32 driven by an electric motor 33 via a gearbox 34. The gearbox arrangement will be described in greater detail below. Thus, the motor 33 drives the pinions 32 through the gearbox 34 and the drilling assembly 9 is moved in either direction across the support beams 5 and 6 on the tracks 10 and 11. Since the tracks 10 and 11 are arranged in the manner shown in FIG. 3 of the drawings, movement of the drilling assembly 9 as a result of the torsional forces applied during drilling operations will be minimized. Thus, the drilling assembly 9 may be accurately positioned with respect to the workpiece W supported on the table 1 without the need to compensate for torsional movements caused by the drilling operation. The extreme positions of the drilling assembly 9 with respect to the support beams 5 and 6 is controlled by limit switches 35, one of which is shown in FIGS. 1 and 3 of the drawings.

Figure 7:
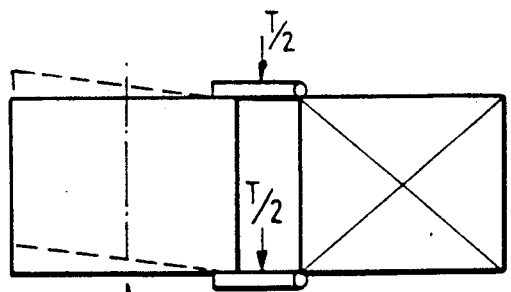
FIGS. 7, 9, 11 and 13 are schematic diagrams of drilling mechanisms according to the prior art.
Figure 8:
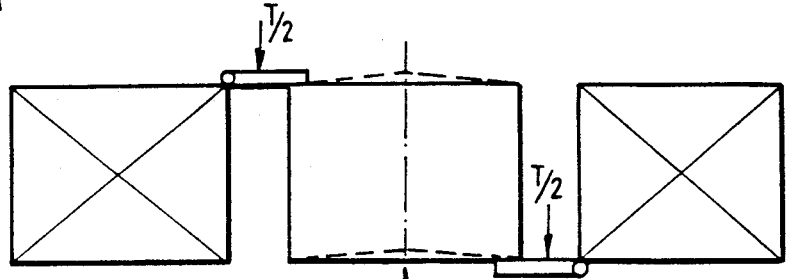
FIGS. 8, 10, 12 and 14 are similar schematic diagrams showing the drilling mechanism embodying the invention.

The above advantage will be more clearly appreciated by reference to FIGS. 7–12 of the drawings which compare the apparatus of the embodyment with prior art arrangements. Referring first to FIGS. 7 and 8, it will be noted that the drilling thrust T applied to the drilling assembly 9 will be equally divided between the beams 5 and 6 via the linear bearings. Thus the distortion of the prior art drill box clearly shown in FIG. 7 of the drawings is substantially eliminated.

Figure 9:
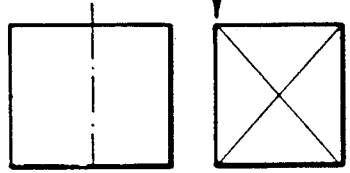
Figure 10:
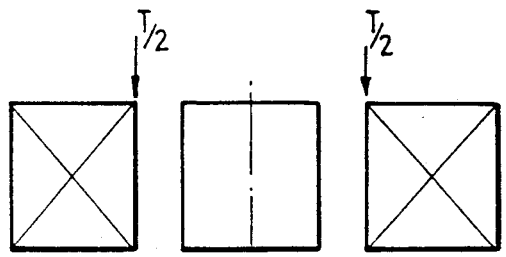
Figure 11:
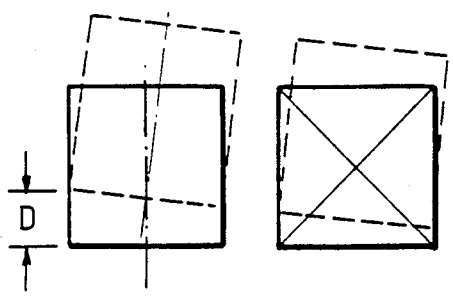
Figure 12:
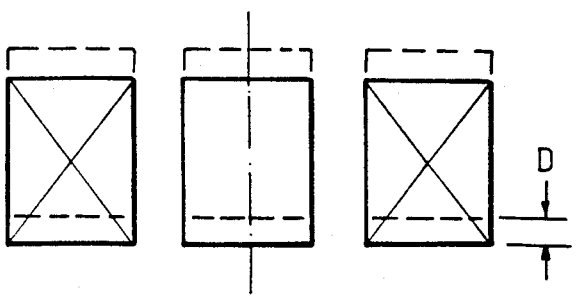

Referring now to FIGS. 9 and 10, because the drilling thrust T is taken equally by the beams 5 and 6, the moment arm TL present in the prior art arrangement shown in FIG. 9 of the drawings is avoided, thus reducing the twisting moments applied to the beams. Similarly, as shown in FIGS. 11 and 12, because the drilling thrust force is taken equally by the beams 5 and 6, the vertical deflection of each beam will be the same, thereby avoiding the non-vertical movement of the prior art arrangement shown in FIG. 11 of the drawings.

As shown best in FIG. 3, the housing 25 encloses a drill carriage 36 mounted for vertical movement in linear bearings 37 and carrying an automatic drill changer 38 cooperating with a drill head 39, both of known construction. The machanism is enclosed within a protective bellows 40 and is driven by an electric motor 41 through toothed drive belt 42 and ball screw 42A.

The housing 25 also carries a shaped pneumatically operated clamping foot 43 by means of which the workpiece W is clamped against the table 1 during the drilling and other operations. As shown in FIG. 3, the clamping foot 43 is attached to the piston rods 45 of a pair of pneumatic cylinders 46 and includes a novel clamping mechanism 47, shown in enlarged detail in FIG. 4.

The clamping mechanism 47 includes a composite locking sleeve 48 comprising a fluid-impervious nylon outer sleeve 49 and an inner brass sleeve 50 formed with circumferentially space slits (not shown) which increase the flexibility of the brass sleeve 50. The composite sleeve 48 is located by annular end fittings 51, 52 and the sleeve 48 is surrounded by a body 53 formed with a cavity 54 into which high pressure hydraulic fluid may be injected. It will be appreciated that as the fluid under pressure is injected into the cavity 54, the composite sleeve 48 is distended inwardly until the brass sleeve 50 makes contact with the piston rod 45 to thereby clamp the piston rod 45 in any desired extended position.

As shown in FIG. 4A, the clamping foot 43 has a generally U-shaped central portion 44 which in use surrounds that portion of the workpiece W which is being drilled. The shape of the foot 43 serves to ensure that the workpiece W is clamped immediately adjacent the working area whereby maximum rigidity of the workpiece during drilling is ensured. In this way, the workpiece W will be held against rotation due to the applied drilling torque and that portion of the workpiece W between the lines of applied force of the pneumatic cylinders 46 will be held against buckling resulting from the applied drilling thrust.

The clamping foot 43 is found with internal passages 43a through which water flows to openings (not visible) in the bottom face and the inner face of the central portion 44 of the foot 43 at the positions 43b and 43c respectively. Water enters at 43d and is discharged through these openings at 43b and 43c to create a hydrodynamic bearing under the foot 43 and to assist in removing swarf from the drilling region.

Figure 13:
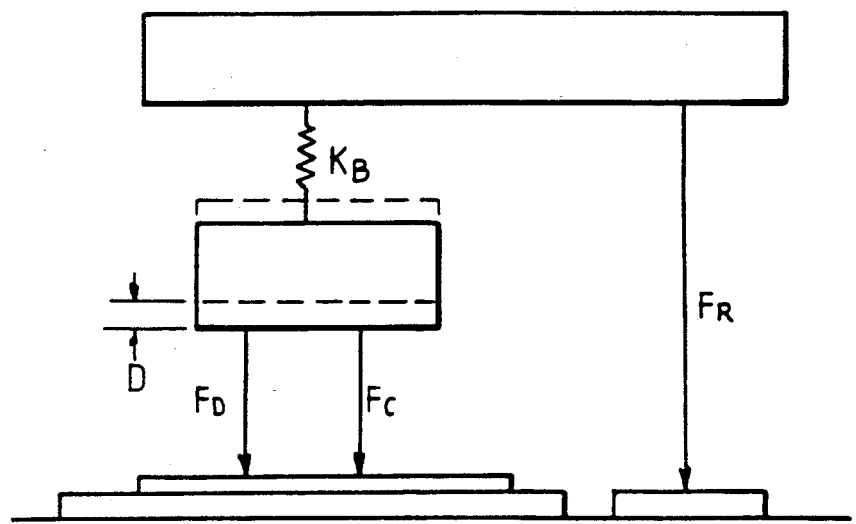
Figure 14:
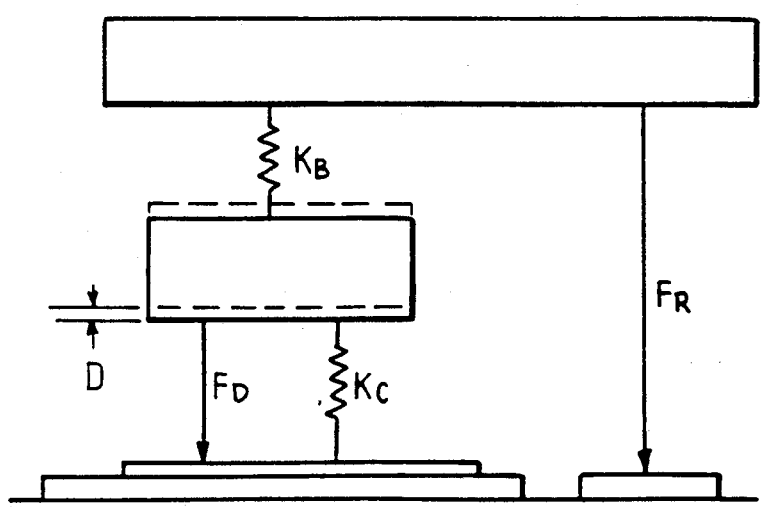

To further ensure maximum rigidity during drilling, the computerised operating system of the machine is programmed to apply a large initial load to the clamping foot 43, preferably of the order of 50% greater than the maximum drilling thrust force, by means of the pneumatic cylinders 46, to cause an upward deflection of the beams 5 and 6. The piston rods 45 are then rigidly clamped in position by means of the hydraulic clamping mechanisms 47 whereby a rigid link is created between the drilling assembly 9 and the clamping foot 43. In this way, any variation in the drilling force, as invariably occurs during drilling, will have little effect on the vertical deflection of the drilling assembly 9 by virtue of the pre-loading applied by the deflected beams 5 and 6 via the rigid link referred to above. The improvement in drilling performance introduced by this arrangement will be better understood by consideration of FIGS. 13 and 14, comparing the arrangement of the present invention with the prior art. In these figures, $K_B$ equals beam stiffness, $F_D$ equals drilling force, $F_R$ equals beam and drill weight on rails, $F_C$ equals clamping force and $K_C$ equals clamping foot stiffness.

As will be clearly appreciated from FIGS. 13 and 14, when a drill is about to pierce through the workpiece W, the resistance of the workpiece to the drill thrust is reduced and it is possible for the applied drill thrust force to "punch out" the last part of a hole. This is most undesirable as the drill can be damaged and the drill hole not properly formed. The above described arrangement reduces this effect greatly because of the higher stiffness between the workpiece on the drilling assembly 9 afforded by the stiffness $K_C$ of the clamping foot 43. This advantage is not present in the prior art arrangements which apply a constant clamping force $F_C$ using pneumatic cylinders only since the plate clamping means does not increase the plate-to-drilling assembly stiffness in any way. Also, the large vertical pre-load applied to the drilling assembly 9 pre-loads the linear bearings linking the drilling assembly 9 to the beams 5 and 6. This increases the stiffness of the linear bearings which in turn improves the location of the drilling assembly 9 leading to improved drilling accuracy and operation.

Referring now to FIG. 5 of the drawings, the drill head 39 will be seen to be driven by an electric motor 55 via a toothed belt 56. A coolant injector 57 is provided to inject coolant through the main drive shaft of the drill head 39 in a manner known in the art. Further coolant may be injected onto the workpiece W via coolant tube 58.

A tool changing mechanism 59 of known construction extends to one side of the housing 25 and by means of which drills and other tools (not shown) mounted on a rotary holder 60 may be transported into position for fitting to the drill head 39. Since the tool changer is of known construction, further description thereof is not required.

Figure 6:
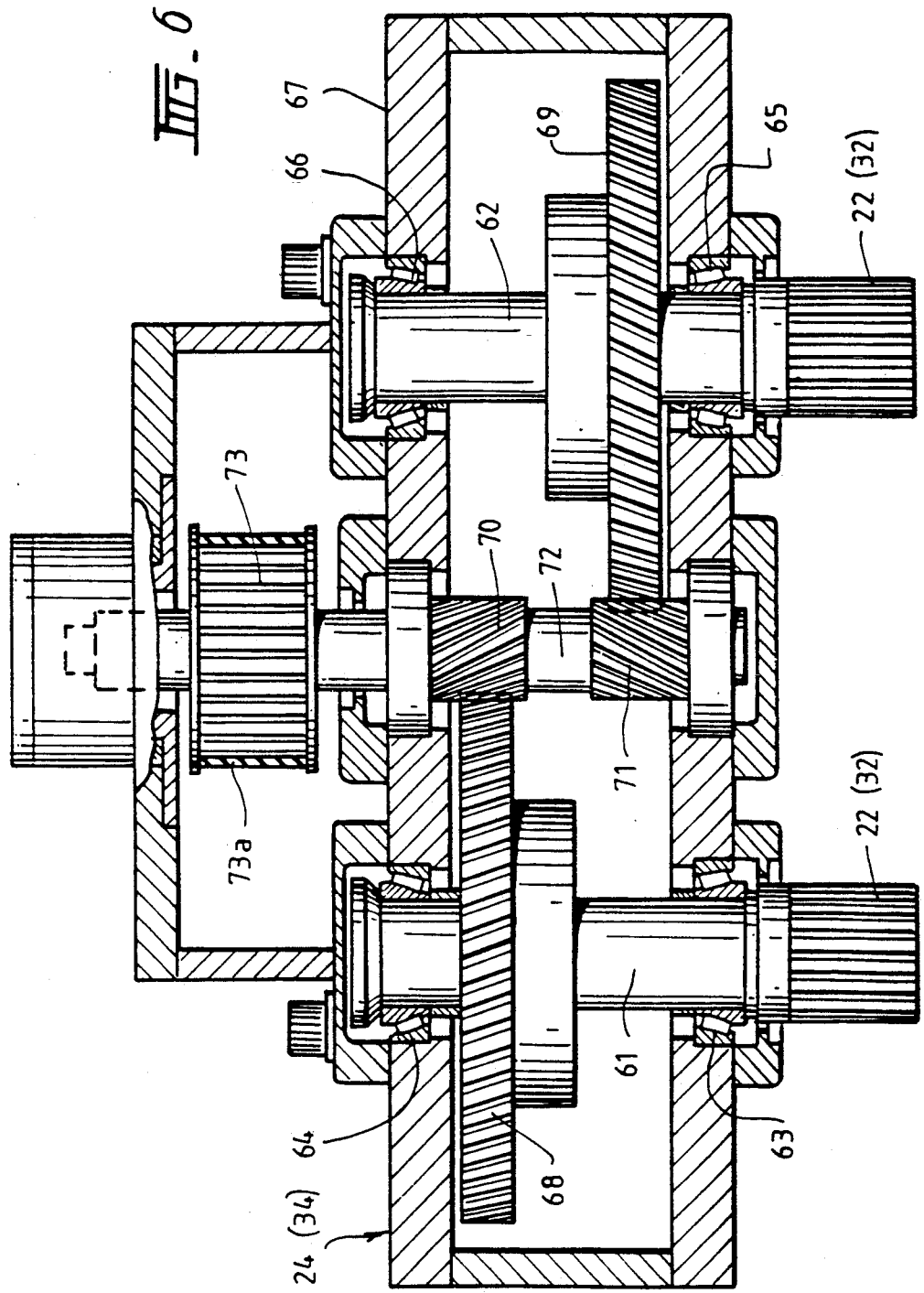
FIG. 6 is a sectional end elevation of a gearbox and pinion arrangement suitable for driving the support means along the rails and for driving the drilling means and profiling means across the support beams.

Referring now to FIG. 6 of the drawings, the gearbox shown in section is typical of the gearboxes 24 and 34, although the ratios in each gearbox are of course different. The pinions 22 (32) have their shafts 61, 62 mounted in spaced tapered roller bearings 63, 64 and 65, 66 mounted in the gearbox housing 67. Each shaft 61, 62 carries a gear 68, 69 each of which meshes with a gear 70, 71 carried on a drive shaft 72 which is driven by the electric motor 23 (33) via a toothed belt drive 73a engaging a toothed drive head 73.

It will be noted that the gears 70 and 71 are oppositely bevelled so that the gears 68 and 69 and thus the shafts 61 and 62 are biased outwardly whereby the pinions 22 (32) are forced onto opposing faces of the teeth of the rack whereby little or no backlash is evident in the pinion drive. The importance of reducing backlash to a minimum is of course important where accuracy of positioning of the apparatus with respect to the workpiece W is paramount.

As mentioned above, the operations of the electric motors 23 and 33 is controlled by a computer numerical control system C mounted in the cross member 8. The control system is programmable to perform repetitive operations on the workpiece W but may be manually controlled if desired. The control system includes a VDU and keyboard to enable the creation, deletion or modification of controlling programmes. Alternatively, a programme may be loaded directly from a separate computer system. The control system also controls the motors 41 and 55 to control the depth of penetration of the tool carried by the drill head 39 as well as the direction of rotation of the drill head 39. Similarly, coolant fluid flow and the operation of the plasma and oxy/fuel torches are controlled by the control system C. As also mentioned above, a plate marking system, such as a flame powder marker of known construction, may be mounted on the structure 12 to enable the workpiece W to be marked for subsequent bending and welding operations.

I claim:

1. A plate working machine, comprising:
   first means for supporting a metal plate to be worked in a generally horizontal plane, said first supporting means having sides;
   a pair of rails extending along said sides of said first plate supporting means;
   driven support means engaging said rails for travel therealong, said driven support means comprising a spaced pair of support beams extending from one of said rails to the other of said rails and having corresponding ends;
   tracks mounted on said beams;
   cross members joining said corresponding ends of said beams;
   means for drilling;
   second means for supporting said drilling means between said support beams, said second supporting means being mounted on said tracks;
   drive means for moving said drilling means along said support beams from one of said sides of said first plate supporting means to the other of said sides of said first plate supporting means;
   means supported by said second supporting means for clamping said plate;
   means for applying a clamping force to said plate through said clamping means, said force being selected to be larger than the greatest expected force of said drilling means applied to said plate and being effective to hold said clamping means in a clamped position; and
   means for locking said clamping means in said clamped position while said clamping force is applied to said plate.

2. A machine according to claim 1, further comprising:
   said support beams having a top and a bottom; and
   said tracks on said support beams being secured to said top of one of said support beams and to said bottom of said other of said support beams.

3. A machine according to claim 1, further comprising:
   said rails having a top;
   said support beams having a top; and
   a drive system for moving said driven support means along said rails and for moving said drilling means along said support beams, said drive system comprising electric motors, gearboxes, one of said gearboxes driven by one of said electric motors, a pair of pinion gears, and racks mounted on said top of one of said rails and on said top of one of said support beams, one of said racks meshing with one of said pinion gears.

4. A machine according to claim 3, further comprising:
   said racks having teeth provided with faces with which said pinion gears engage; and
   each said gearbox is provided with a gear arrangement which biases said pinion gears in opposite directions so that said pinion gears engage opposing ones of said faces of said teeth of said racks to thereby reduce the backlash in said drive system.

5. A plate working machine according to claim 1, further comprising:
   said clamping means comprising at least one clamping foot positioned to engage the plate to be worked,
   said applying means being effective to apply a substantially perpendicular clamping force to the plate to be worked through said clamping foot, and
   said means for locking being effective to lock said clamping foot in the clamped position whereby said applying means may be deactivated to reduce the loads applied to said second supporting means during plate working operations.

6. A machine according to claim 1, wherein said plate has a region to be worked, further comprising:
   said clamping means comprising a clamping foot having a portion which partially surrounds said region of said plate to be worked.

7. A machine according to claim 1, wherein said plate has a region to be worked, further comprising:
   said clamping means including a clamping foot and said clamping foot including liquid receiving passages which open under said clamping foot to create a hydrodynamic bearing under said clamping foot and in said region of the plate to be worked.

8. A machine according to claim 1, further comprising:
   said locking means comprising a piston rod extending from said means for applying the clamping force, a deformable sleeve surrounding said piston rod, and fluid pressure means for deforming said sleeve into locking engagement with said piston rod to thereby lock said clamping means in position.

9. A machine according to claim 1, further comprising:
   profile cutting means mounted on said second supporting means and extending over one of said support beams and downwardly towards a position adjacent to said first plate supporting means.

* * * * *